US012315404B2

(12) United States Patent
Park et al.

(10) Patent No.: US 12,315,404 B2
(45) Date of Patent: May 27, 2025

(54) DISPLAY PANEL AND METHOD FOR INSPECTING DISPLAY PANEL

(71) Applicant: Samsung Display Co., Ltd., Yongin-si (KR)

(72) Inventors: Junhyun Park, Suwon-si (KR); Jangmi Kang, Seoul (KR); Hyeongseok Kim, Hwaseong-si (KR); Minjae Jeong, Hwaseong-si (KR); Mukyung Jeon, Ulsan (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 247 days.

(21) Appl. No.: 17/881,010

(22) Filed: Aug. 4, 2022

(65) Prior Publication Data

US 2023/0085612 A1 Mar. 16, 2023

(30) Foreign Application Priority Data

Sep. 14, 2021 (KR) ........................ 10-2021-0122693

(51) Int. Cl.
*G09G 3/00* (2006.01)
*G09G 3/32* (2016.01)
*H10K 59/124* (2023.01)

(52) U.S. Cl.
CPC ............... *G09G 3/006* (2013.01); *G09G 3/32* (2013.01); *G09G 2300/0426* (2013.01); *G09G 2300/0842* (2013.01); *G09G 2310/0278* (2013.01)

(58) Field of Classification Search
CPC .............. H10K 59/1213; H10K 59/124; G02F 1/13454
See application file for complete search history.

(56) References Cited

U.S. PATENT DOCUMENTS

| | | | | |
|---|---|---|---|---|
| 11,170,704 | B2 | 11/2021 | An et al. | |
| 2013/0120228 | A1* | 5/2013 | Yoon | G09G 3/3233 345/80 |
| 2013/0229401 | A1* | 9/2013 | Kim | G09G 3/3648 345/212 |
| 2013/0257437 | A1* | 10/2013 | Jin | G01R 31/2635 257/40 |
| 2014/0292623 | A1* | 10/2014 | Moon | G09G 3/3233 345/82 |
| 2015/0379910 | A1* | 12/2015 | Nishinohara | G09G 3/006 345/82 |
| 2017/0309209 | A1* | 10/2017 | Kenmotsu | G09G 3/006 |

FOREIGN PATENT DOCUMENTS

| | | | |
|---|---|---|---|
| KR | 1020170038345 | A | 4/2017 |
| KR | 1020170090539 | A | 8/2017 |
| KR | 1020210038767 | A | 4/2021 |

* cited by examiner

*Primary Examiner* — Jermele M Hollington
*Assistant Examiner* — Temilade S Rhodes-Vivour
(74) *Attorney, Agent, or Firm* — CANTOR COLBURN LLP

(57) ABSTRACT

A display panel includes: a plurality of pixels, each of which includes a light emitting element and a pixel circuit for driving the light emitting element; a plurality of scan lines connected to the pixel circuit; and a data line connected to the pixel circuit. The pixel circuit includes: a transfer capacitor connected to a first node and a second node; a first circuit part including the first node; a second circuit including the second node and connected with the light emitting element; and a test unit connected to the first circuit part and the second circuit part.

18 Claims, 15 Drawing Sheets

DISPLAY PANEL AND METHOD FOR INSPECTING DISPLAY PANEL

This application claims priority to Korean Patent Application No. 10-2021-0122693 filed on Sep. 14, 2021, and all the benefits accruing therefrom under 35 U.S.C. § 119, the content of which in its entirety is herein incorporated by reference.

BACKGROUND

Embodiments of the present disclosure described herein relate to a display panel and a method for inspecting a display panel.

A display panel may include a plurality of pixels and driving circuits (e.g., a scan driving circuit, a data driving circuit, and a light emitting driving circuit) for controlling the plurality of pixels. Each of a plurality of pixels may include a light emitting element and a pixel circuit for controlling the light emitting element. The pixel circuit may include a plurality of thin-film transistors ("TFTs") which are organically connected with each other. A driving current supplied to the light emitting element may be controlled by the plurality of TFTs. Thus, when the plurality of transistors do not operate properly or when lines connecting the plurality of TFTs are cut or short-circuited, a driving current may not be normally supplied to the light emitting element. Thus, whether the TFTs of the pixel circuit perform a normal operation may be checked to repair the defect or such that a subsequent process does not proceed.

SUMMARY

Embodiments of the present disclosure provide a method for inspecting a pixel circuit included in a display panel.

Embodiments of the present disclosure provide a display panel having a pixel circuit capable of being tested.

According to an embodiment, a display panel includes: a plurality of pixels, each of which includes a light emitting element and a pixel circuit for driving the light emitting element; a plurality of scan lines connected to the pixel circuit; and a data line connected to the pixel circuit. The pixel circuit includes: a transfer capacitor connected to a first node and a second node; a first circuit part including the first node; a second circuit including the second node and connected with the light emitting element; and a test unit connected to the first circuit part and the second circuit part.

The test unit may include a test thin-film transistor ("TFT"). The test TFT may include a first electrode connected to the first node, a second electrode connected to the second node, and a gate electrode.

The display panel may further include a test line connected to the gate electrode of the test TFT. A test signal for controlling an operation of the test TFT may be provided to the test line.

The test unit may include a first line portion connected to the first node and a second line portion connected to the second node. The first line portion and the second line portion may be electrically insulated from each other.

The display panel may further include first to sixth driving voltage lines connected to the pixel circuit and the light emitting element. The first circuit part may include a switching TFT connected between the first node and the data line, a hold capacitor connected between the first node and the first driving voltage line, and a transfer TFT connected between the first node and the third driving voltage line. A first power voltage may be supplied to the first driving voltage line and a reference voltage may be supplied to the third driving voltage line.

The test unit may include a test TFT. The test TFT may include a first electrode connected to the data line, a second electrode connected to the second node, and a gate electrode.

The second circuit part may include a driving TFT including a gate electrode connected to the second node, a first electrode, and a second electrode, a compensation TFT connected to the second node and the second electrode of the driving TFT, a first initialization TFT connected to the second node and the fourth driving voltage line, a light emitting control TFT connected between the second electrode of the driving TFT and the light emitting element, an operation control TFT connected between the first electrode of the driving TFT and the first driving voltage line, a second initialization TFT connected to the light emitting control TFT and the fifth driving voltage line, and a bias TFT connected to the first electrode of the driving TFT and the sixth driving voltage line.

The test unit may include a test TFT. The test TFT may include a first electrode connected to the first node, a second electrode connected to the second electrode of the driving TFT, and a gate electrode.

The gate electrode of the test TFT may be connected to one of the plurality of scan lines.

The display panel may further include a test line connected to the gate electrode of the test TFT. A test signal for controlling an operation of the test TFT may be provided to the test line.

According to an embodiment, a method for testing a display panel includes: supplying a test voltage to a pixel circuit, wherein the pixel circuit includes a transfer capacitor, a first circuit part electrically connected to a first electrode of the transfer capacitor, and a second circuit part electrically connected to a second electrode of the transfer capacitor; and measuring a signal delivered to at least one line connected to the pixel circuit.

The pixel circuit may further include a test unit connected to the first circuit part and the second circuit part. The test voltage may be supplied to the second circuit part. The at least one line may be connected to the first circuit part. The signal may be a signal delivered to the first circuit part through the second circuit part and the test unit.

The test voltage may be supplied through a data line connected to the first circuit part. The test voltage may include a black gray scale voltage and a white gray scale voltage. The measuring of the signal may include sensing a first current of the signal through the at least one line connected to the second circuit part, when the black gray scale voltage is supplied, sensing a second current of the signal through the at least one line connected to the second circuit part, when the white gray scale voltage is supplied, and converting the first current and the second current into a converted voltage and determining abnormality in the pixel circuit based on the converted voltage.

The pixel circuit may further include a test unit connected to the first circuit part and the second circuit part. The test unit may include a test TFT. The test TFT may include a first electrode connected to the first circuit part, a second electrode connected to the second circuit part, and a gate electrode. A direct current (DC) signal for test is provided to the gate electrode.

The pixel circuit may further include a test unit connected to the first circuit part and the second circuit part. The test unit may include a test TFT. The test TFT may include a first electrode connected to the first circuit part, a second electrode connected to the second circuit part, and a gate electrode. An alternating current (AC) signal for test is provided to the gate electrode.

The pixel circuit may further include a test unit connected to the first circuit part and the second circuit part. The test unit may include a test TFT. The test TFT may include a first electrode connected to the first circuit part, a second electrode connected to the second circuit part, and a gate electrode. One of a plurality of scan signals provided to the pixel circuit may be provided to the gate electrode.

The pixel circuit may further include a test unit connected to the first circuit part and the second circuit part. The test unit may include a line directly connected to the first circuit part and the second circuit part.

The pixel circuit may further include a test unit connected to the first circuit part and the second circuit. The method may further include removing a portion of the test unit, after measuring the signal.

The pixel circuit and a light emitting element, the operation of which is controlled by the pixel circuit, may be connected with first to sixth driving voltage lines. The first circuit part may include a switching TFT connected between the first node and a data line, a hold capacitor connected between the first node and the first driving voltage line, and a transfer TFT connected between the first node and the third driving voltage line. The second circuit part may include a driving TFT including a gate electrode connected to a second node, a first electrode, and a second electrode, a compensation TFT connected to the second node and the second electrode of the driving TFT, a first initialization TFT connected to the second node and the fourth driving voltage line, a light emitting control TFT connected between the second electrode of the driving TFT and the light emitting element, an operation control TFT connected between the first electrode of the driving TFT and the first driving voltage line, a second initialization TFT connected to the light emitting control TFT and the fifth driving voltage line, and a bias TFT connected to the first electrode of the driving TFT and the sixth driving voltage line. The method may further include determining whether an operation of at least one of the switching TFT, the transfer TFT, the driving TFT, the compensation TFT, the first initialization TFT, the light emitting control TFT, the operation control TFT, the second initialization TFT, and the bias TFT malfunctions based on the signal.

The pixel circuit may further include a test unit connected to the first circuit part and the second circuit. The test unit may be connected to the first electrode of the transfer capacitor and the second electrode of the transfer capacitor, may be connected to the data line and the second electrode of the transfer capacitor, or may be connected to the first electrode of the transfer capacitor and the second electrode of the driving TFT, to deliver the signal based on the test voltage from the first circuit part to the second circuit part or from the second circuit part to the first circuit part.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
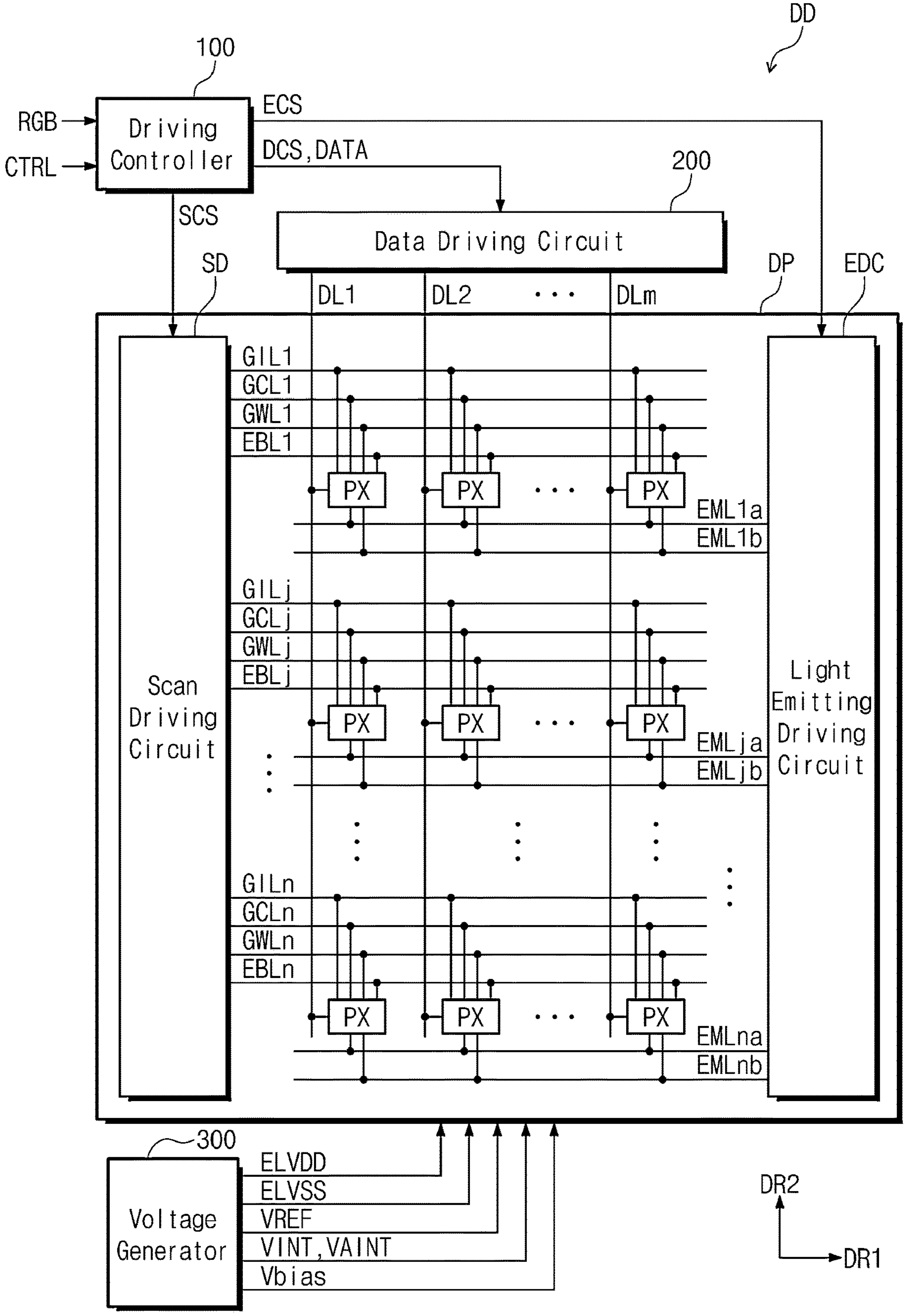
FIG. 1 is a block diagram of a display device according to an embodiment of the present disclosure.

In the specification, the expression that a first component (or region, layer, portion, etc.) is "on", "connected with", or "coupled with" a second component means that the first component is directly on, connected with, or coupled with the second component or means that a third component is interposed therebetween.

The same reference numerals refer to the same components. Also, in the drawings, the thicknesses, the ratios, and the dimensions of the elements may be exaggerated for effective description of technical contents. The expression "and/or" includes one or more combinations which associated components are capable of defining.

Although the terms "first," "second," etc. may be used herein in describing various elements, such elements should not be construed as being limited by these terms. These terms are only used to distinguish one element from another element. For example, a first element could be termed a second element without departing from the scope of the claims of the present disclosure, and similarly a second element could be termed a first element. The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device DD according to an embodiment of the present disclosure.

Referring to FIG. 1, a display device DD may include a display panel DP, a driving controller 100, a data driving circuit 200, and a voltage generator 300.

The driving controller 100 may receive an input image signal RGB and a control signal CTRL. The driving controller 100 may generate an output image signal DATA into which a data format of the input image signal RGB is converted to suit interface specifications with the data driving circuit 200. The driving controller 100 may output a scan driving signal SCS, a data driving signal DCS, and a light emitting driving signal ECS.

The data driving circuit 200 may receive the data driving signal DCS and the output image signal DATA from the driving controller 100. The data driving circuit 200 may convert the output image signal DATA into data signals and may output the data signals to a plurality of data lines DL1-DLm which will be described below. The data signals may be analog voltages corresponding to a gray scale value of the output image signal DATA.

The voltage generator 300 may generate voltages for an operation of the display panel DP. In an embodiment, the voltage generator 300 may generate a first driving voltage ELVDD, a second driving voltage ELVSS, a reference voltage VREF, a first initialization voltage VINT, a second initialization voltage VAINT, and a bias voltage Vbias.

The display panel DP may include scan lines GIL1-GILn, GCL1-GCLn, GWL1-GWLn, and EBL1-EBLn, light emitting control lines EML1*a*-EMLna and EML1*b*-EMLnb, data lines DL1-DLm, and pixels PX. The display panel DP may further include a scan driving circuit SD and a light emitting driving circuit EDC. The scan lines GIL1-GILn may be referred to as first initialization scan lines GIL1-GILn. The scan lines GCL1-GCLn may be referred to as compensation scan lines GCL1-GCLn. The scan lines GWL1-GWLn may be referred to as write scan lines GWL1-GWLn. The scan lines EBL1-EBLn may be referred to as second initialization scan lines EBL1-EBLn.

The pixels PX may be arranged on a display area, and the scan driving circuit SD and the light emitting driving circuit EDC may be arranged on a non-display area. However, the present disclosure is not limited thereto. At least some of the pixels PX may be overlapped with the scan driving circuit SD and the light emitting driving circuit EDC. In this case, at least a part of the scan driving circuit SD and at least a part of the light emitting driving circuit EDC may be arranged on the display area.

The scan driving circuit SD may receive the scan driving signal SCS from the driving controller 100. The scan driving circuit SD may output scan signals to the scan lines GIL1-GILn, GCL1-GCLn, GWL1-GWLn, and EBL1-EBLn in response to the scan driving signal SCS. The light emitting driving circuit EDC may receive a light emitting driving signal ECS from the driving controller 100. The light emitting driving circuit EDC may output light emitting control signals to the light emitting control lines EML1*a*-EMLna and EML1*b*-EMLnb in response to the light emitting driving signal ECS.

The scan driving circuit SD may be disposed at a first side of the display panel DP. The scan lines GIL1-GILn, GCL1-GCLn, GWL1-GWLn, and EBL1-EBLn may be extended in a first direction DR1 from the scan driving circuit SD. The light emitting driving circuit EDC may be disposed at a second side of the display panel DP. The light emitting control lines EML1*a*-EMLna and EML1*b*-EMLnb may be extended in a direction opposite to the first direction DR1 from the light emitting driving circuit EDC. The scan lines GIL1-GILn, GCL1-GCLn, GWL1-GWLn, and EBL1-EBLn and the light emitting control lines EML1*a*-EMLna and EML1*b*-EMLnb may be arranged spaced apart from each other in the second direction DR2. The data lines DL1-DLm may be extended in a direction opposite to the second direction DR2 from the data driving circuit 200 and may be arranged spaced apart from each other in the first direction DR1.

In the example shown in FIG. 1, the scan driving circuit SD and the light emitting driving circuit EDC may be arranged to face each other across the pixels PX, but the present disclosure is not limited thereto. For example, the scan driving circuit SD and the light emitting driving circuit EDC may be disposed adjacent to each other at any one of the first side and the second side of the display panel DP. In an embodiment, the scan driving circuit SD and the light emitting driving circuit EDC may be configured as one circuit.

The display panel DP may include the scan lines GIL1-GILn, GCL1-GCLn, GWL1-GWLn, and EBL1-EBLn, the light emitting control lines EML1*a*-EMLna and EML1*b*-EMLnb, and the data lines DL1-DLm. Each of the plurality of pixels PX may be electrically connected to four scan lines, two light emitting control lines, and one data line. For example, as shown in FIG. 1, pixels in a first row may be connected to the scan lines GIL1, GCL1, GWL1, and EBL1 and the light emitting control line EML1*a* and EML1*b*. Furthermore, pixels in a j-th row may be connected to scan lines GILj, GCLj, GWLj, and EBLj and light emitting control lines EMLja and EMLjb.

Each of the plurality of pixels PX includes a light emitting element ED (refer to FIG. 2) and a pixel circuit PXC (refer to FIG. 2) controlling light emission of the light emitting element ED. The pixel circuit PXC may include one or more transistors and one or more capacitors. The scan driving circuit SD and the light emitting driving circuit EDC may include transistors formed through the same process as the pixel circuit PXC.

Each of the plurality of pixels PX may receive the first driving voltage ELVDD, the second driving voltage ELVSS, the reference voltage VREF, the first initialization voltage VINT, the second initialization voltage VAINT, and the bias voltage Vbias from the voltage generator 300.

Figure 2:
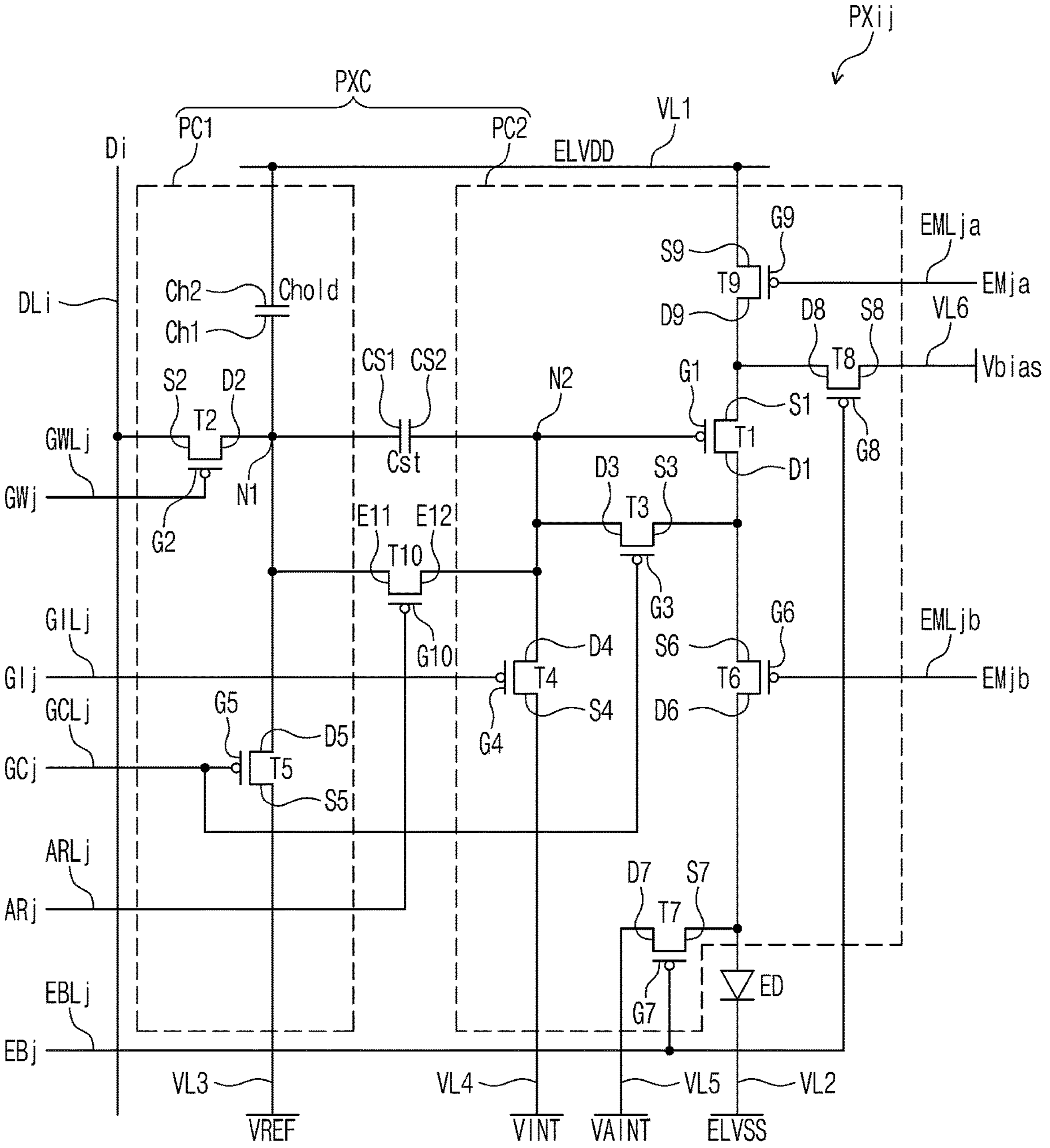
FIG. 2 is an equivalent circuit diagram of a pixel according to an embodiment of the present disclosure.

FIG. 2 is an equivalent circuit diagram of a pixel PXij according to an embodiment of the present disclosure.

FIG. 2 illustrates an equivalent circuit diagram of a pixel PXij connected to an i-th data line DLi among data lines DL1-DLm, j-th scan lines GILj, GCLj, GWLj, and EBLj among scan lines GIL1-GILn, GCL1-GCLn, GWL1-GWLn, and EBL1-EBLn, and j-th light emitting control lines EMLja and EMLjb among light emitting control lines EML1*a*-EMLna and EML1*b*-EMLnb. Each of a plurality of pixels PX shown in FIG. 1 may have the same circuit configuration as the equivalent circuit diagram of the pixel PXij shown in FIG. 2.

The pixel circuit PXC may include first to ninth transistors T1, T2, T3, T4, T5, T6, T7, T8, and T9, a hold capacitor Chold, a transfer capacitor Cst, and a test unit. Moreover, the circuit configuration of the pixel PXij according to the present disclosure is not limited to FIG. 2. The pixel PXij illustrated in FIG. 2 is only an example, and the circuit configuration of the pixel PXij according to the invention may be modified and implemented.

The first transistor T1 may be referred to as a driving thin-film transistor (TFT). The second transistor T2 may be referred to as a switching TFT. The third transistor T3 may be referred to as a compensation TFT. The fourth transistor T4 may be referred to as a first initialization TFT. The fifth transistor T5 may be referred to as a transfer TFT. The sixth transistor T6 may be referred to as a light emitting control TFT. The seventh transistor T7 may be referred to as a second initialization TFT. The eighth transistor T8 may be referred to as a bias TFT. The ninth transistor T9 may be referred to as an operation control TFT.

The pixel circuit PXC may be divided into a first circuit part PC1 and a second circuit part PC2 with respect to the transfer capacitor Cst. For example, the first circuit part PC1 may be a part connected to a first electrode CS1 of the transfer capacitor Cst, and the second circuit part PC2 may be a part connected to a second electrode CS2 of the transfer capacitor Cst. The first electrode CS1 of the transfer capacitor Cst may be connected to a first node N1 included in the first circuit part PC1, and the second electrode CS2 of the transfer capacitor Cst may be connected to a second node N2 included in the second circuit part PC2. The second circuit part PC2 may be connected to a light emitting element ED. The first circuit part PC1 may be referred to as a first circuit portion or a first portion circuit. The second circuit part PC2 may be referred to as a second circuit portion or a second portion circuit.

A test unit may be connected to the first circuit part PC1 and the second circuit part PC2. The test unit may be referred to as a test connector or a test conductive part. For example, the test unit may include the test TFT T10. The test TFT T10 may be connected to the first circuit part PC1 and the second circuit part PC2. The test TFT T10 may be used as a path for pixel array test. For example, the first circuit part PC1 and the second circuit part PC2 may be connected to the transfer capacitor Cst.

In a case that the test TFT T10 is not provided, a data line DLi connected to a test pad TPD (refer to FIG. 3) and a circuit operation region including the first transistor T1 (or the driving TFT) have a state where they are physically separated, an array test of the pixel circuit PXC using the data line DL1 is impossible. According to an embodiment of the present disclosure, the data line DLi connected to the test pad TPD (refer to FIG. 3) and the circuit operation region including the first transistor T1 (or the driving TFT) may be connected with each other by the test TFT T10. Thus, the array test of the pixel circuit PXC may be possible using the test TFT T10.

Each of the first to ninth transistors T1-T9 and the test TFT T10 may be a P-type transistor having a low-temperature polycrystalline silicon ("LTPS") semiconductor layer. In another embodiment, all the first to ninth transistors T1-T9 and the test TFT T10 may be N-type transistors. In still another embodiment, at least one of the first to ninth transistors T1-T9 and the test TFT T10 may be a P-type transistor, and the remaining transistors may be N-type transistors.

The scan lines GILj, GCLj, GWLj, and EBLj may deliver scan signals GIj, GCj, GWj, and EBj, respectively. The light emitting control lines EMLja and EMLjb may deliver light emitting control signals EMja and EMjb, respectively. The data line DLi may deliver a data signal Di. The data signal Di may have a voltage level corresponding to an input image signal RGB input to a display device DD (refer to FIG. 1). First to sixth driving voltage lines VL1-VL6 may deliver a first driving voltage ELVDD, a second driving voltage ELVSS, a reference voltage VREF, a first initialization voltage VINT, a second initialization voltage VAINT, and a bias voltage Vbias to the pixel PXij, respectively.

The hold capacitor Chold may be connected between the first driving voltage line VL1 and the first node N1. A first electrode Ch1 of the hold capacitor Chold may be connected to the first node N1, and a second electrode Ch2 of the hold capacitor Chold may be connected to the first driving voltage line VL1.

The first transistor T1 may include a first electrode S1 electrically connected with the first driving voltage line VL1 via the ninth transistor T9, a second electrode D1 electrically connected with an anode of the light emitting diode ED via the sixth transistor T6, and a gate electrode G1.

The second transistor T2 may include a first electrode S2 connected with the data line DLi, a second electrode D2 connected with the first node N1, and a gate electrode G2 connected with the scan line GWLj. The second transistor T2 may deliver the data signal Di, received through the data line DLi, to the first node N1 in response to the scan signal GWj received through the scan line GWLj.

The third transistor T3 may include a first electrode S3 connected with the second electrode D1 of the first transistor T1, a second electrode D3 connected with the second node N2, and a gate electrode G3 connected with the scan line GCLj. The third transistor T3 may electrically connect the gate electrode G1 of the first transistor T1 and the second electrode D1 of the first transistor T1 in response to the scan signal GCj received through the scan line GCLj.

The fourth transistor T4 may include a first electrode S4 connected with the fourth driving voltage line (or the initialization voltage line) VL4, a second electrode D4 connected with the second node N2, and a gate electrode G4 connected with the scan line GILj. The fourth transistor T4 may deliver the first initialization voltage VINT, received through the fourth driving voltage line VL4, to the second node N2 in response to the scan signal GIj received through the scan line GILj.

The fifth transistor T5 may include a first electrode S5 connected with the third driving voltage line (or the reference voltage line) VL3, a second electrode D5 connected with the first node N1, and a gate electrode G5 connected with the scan line GCLj. The fifth transistor T5 may be turned on by the scan signal GCj received through the scan line GCLj to deliver the reference voltage VREF to the first node N1.

The sixth transistor T6 may include a first electrode S6 connected with the second electrode D1 of the first transistor T1, a second electrode D6 connected with the anode of the light emitting diode ED, and a gate electrode G6 connected with the light emitting control line EMLjb. The sixth transistor T6 may be turned on by the light emitting control signal EMjb received through the light emitting control line EMLjb to electrically connect the second electrode D1 of the first transistor T1 to the light emitting element ED.

The seventh transistor T7 may include a first electrode S7 connected with the anode of the light emitting element ED, a second electrode D7 connected with the fifth driving voltage line VL5, and a gate electrode G7 connected with the scan line EBLj. The seventh transistor T7 may be turned on according to the scan signal EBj delivered through the scan line EBLj to bypass part of a current of the anode of the light emitting diode ED to the fifth driving voltage line VL5.

The eighth transistor T8 may include a first electrode S8 connected with the sixth driving voltage line VL6, a second electrode D8 connected with the first electrode S1 of the first transistor T1, and a gate electrode G8 connected to the scan line EBLj. The eighth transistor T8 may be turned on by the scan signal EBj received through the scan line EBLj to electrically connect the sixth driving voltage line VL6 to the first electrode S1 of the first transistor T1.

The ninth transistor T9 may include a first electrode S9 connected with the first driving voltage line VL1, a second electrode D9 connected with the first electrode S1 of the first transistor T1, and a gate electrode G9 connected with the light emitting control line EMLja. The ninth transistor T9 may be turned on by the light emitting control signal EMja received through the light emitting control line EMLja to electrically connect the first driving voltage line VL1 to the first electrode S1 of the first transistor T1.

The test TFT T10 may include a first electrode E11 connected with the first node N1, a second electrode E12 connected with the second node N2, and a gate electrode G10 connected with a test line ARLj. The test TFT T10 may be turned on by the test signal ARj received through the test line ARLj to electrically connect the first node N1 and the second node N2.

The light emitting element ED may include an anode connected to the second electrode D6 of the sixth transistor T6 and a cathode connected with the second driving voltage line VL2.

Figure 3:
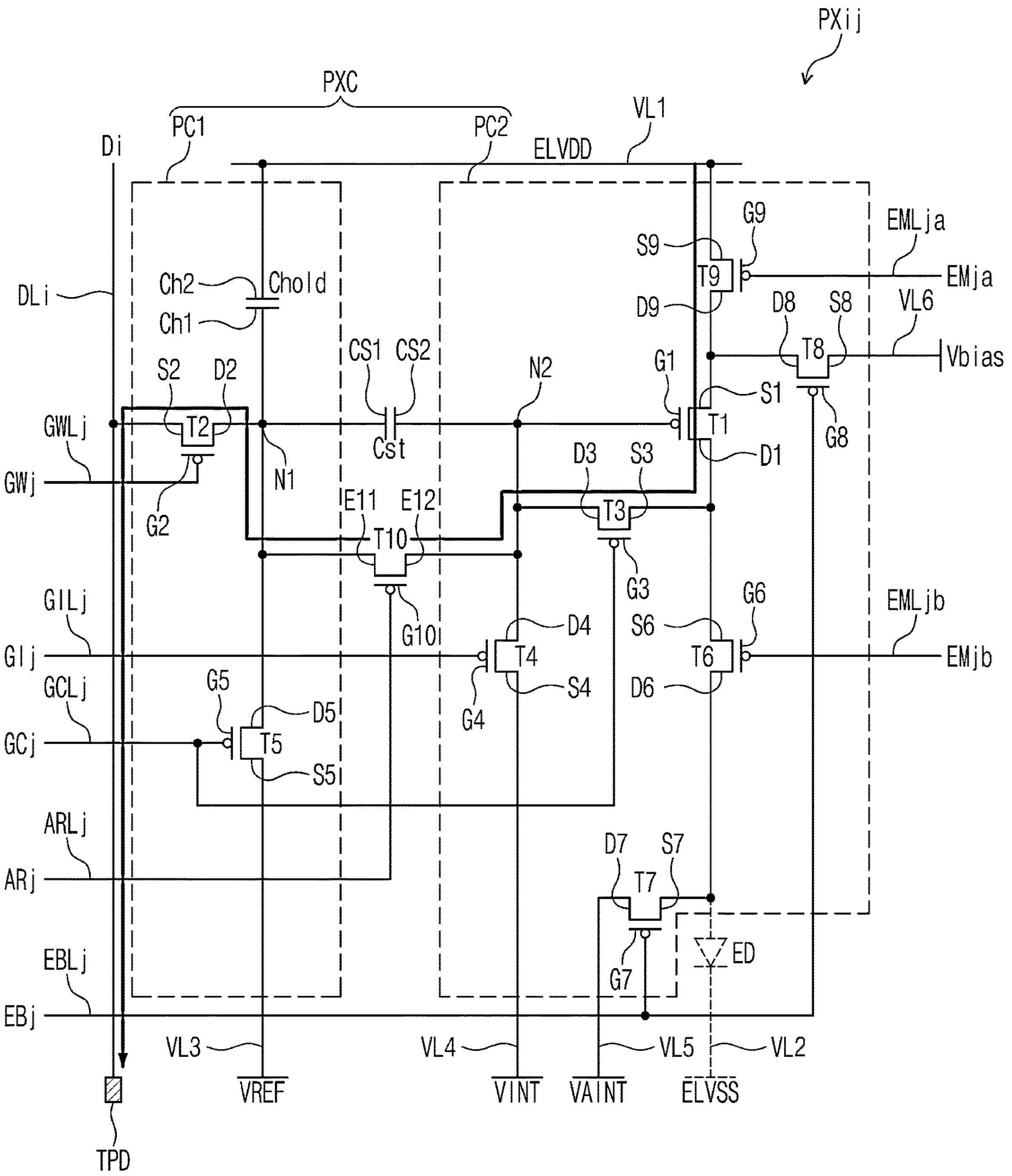
FIG. 3 is a drawing illustrating a test operation of a pixel circuit according to an embodiment of the present disclosure.

FIG. 3 is a drawing illustrating a test operation of a pixel circuit according to an embodiment of the present disclosure.

Referring to FIG. 3, an array test may be to test whether transistors perform a normal operation. An array test of a pixel circuit PXC may be executed during a process of forming a pixel PXij. For example, the array test may proceed before a light emitting element ED is formed. Thus, when it is determined that it is bad (i.e., malfunction) through the array test, the pixel circuit PXC may pass through a repair process. When it is impossible to repair the pixel circuit PXC, the process may not proceed to a next process and be ended. When it is determined that the pixel circuit PXC is normal through the array test, the light emitting element ED may be formed through a subsequent process. Waste of manufacturing time and cost may be effectively reduced by means of the array test of the pixel circuit PXC according to the invention.

When a test voltage is supplied to the pixel circuit PXC, the array test may proceed by measuring a signal delivered to at least one line connected to the pixel circuit PXC. For example, the test voltage may be supplied through the first driving voltage line VL1, and a result signal may be measured through a test pad TPD connected with a data line DLi.

A first circuit part PC1 and a second circuit part PC2 separated by a transfer capacitor Cst may be connected to each other by a test TFT T10. Thus, the test voltage may be delivered to the test pad TPD via a ninth transistor T9, a first transistor T1, a third transistor T3, a test TFT T10, and a second transistor T2. As a voltage received through the test pad TPD is compared with the original test voltage, it may be determined whether transistors perform a normal operation.

Figure 4A:
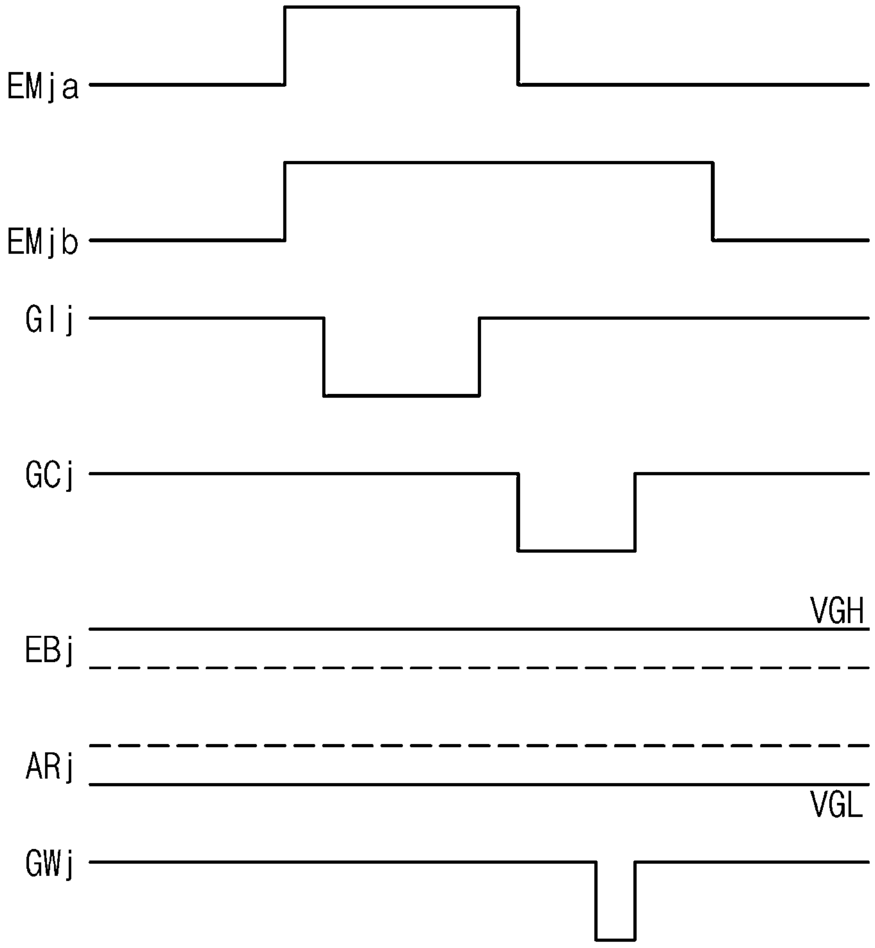
FIG. 4A is a timing diagram illustrating a test operation shown in FIG. 3.

FIG. 4A is a timing diagram illustrating a test operation shown in FIG. 3.

Referring to FIGS. 3 and 4A, when light emitting control signals EMja and EMjb are in an inactive level (e.g., a high level), a scan signal GIj may transition to an active level (e.g., a low level). Thereafter, when the scan signal GIj is transitioned to the inactive level, when the light emitting control signal EMja has the active level, and when the light emitting control signal EMjb is in the inactive level, the scan signal GCj may be transitioned to the active level (e.g., a low level). When the scan signal GCj is in the active level, the scan signal GWj may be transitioned to the active level (e.g., a low level).

During a test interval when the test is proceeding, the scan signal EBj may maintain a high level VGH, and the test signal ARj may maintain a low level VGL. The test signal ARj may be a direct current (DC) signal. Thus, a seventh transistor T7 and an eighth transistor T8 may be kept turned off, and a test TFT T10 may be kept turned on.

Thereafter, after the array test is ended, a high-level DC signal may be provided to a gate electrode G10 of the test TFT T10. The test TFT T10 to which the high-level DC signal is provided may be kept turned off.

Figure 4B:
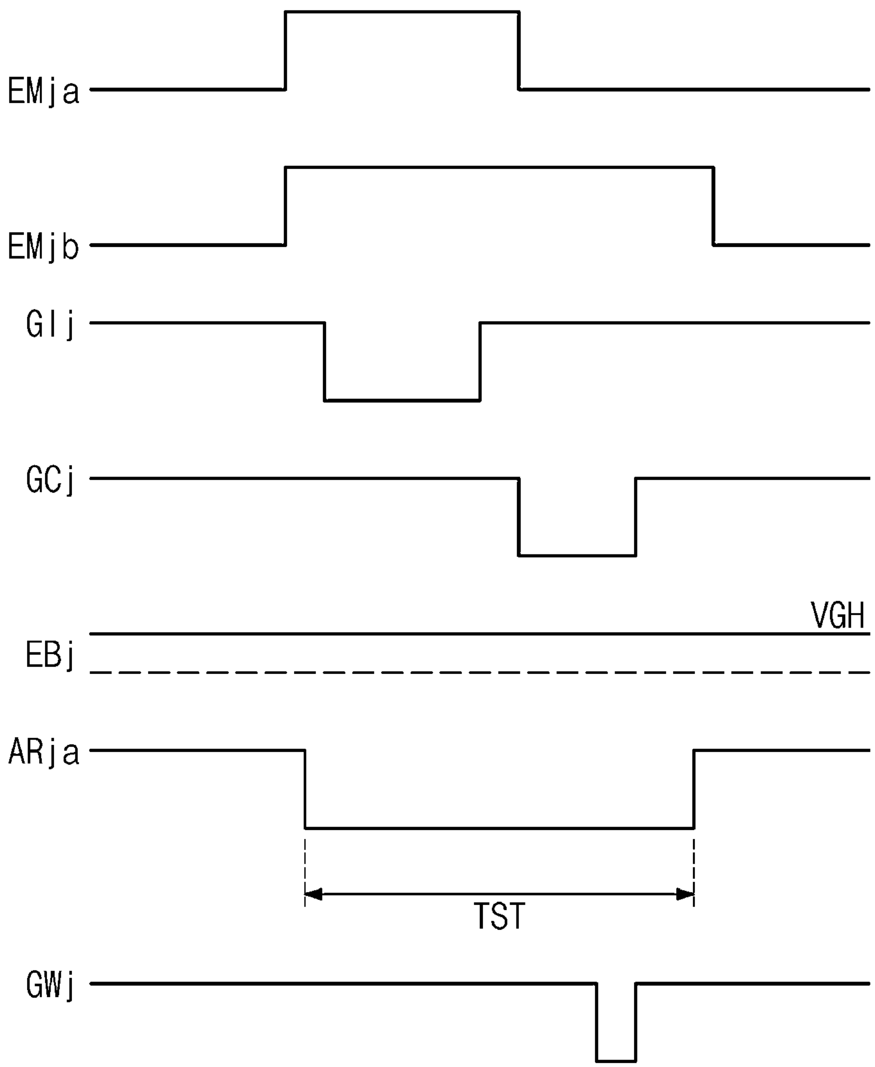
FIG. 4B is a timing diagram illustrating a test operation shown in FIG. 3 according to another embodiment.

FIG. 4B is a timing diagram illustrating a test operation shown in FIG. 3 according to another embodiment.

In describing FIG. 4B, a description will be given of a portion having a difference with FIG. 4A. The same reference numeral as FIG. 4A will be written for the same signal, and a duplicated description thereof will be omitted.

Referring to FIGS. 3 and 4B, a test signal ARja may be a signal having an active level (e.g., a low level) and an inactive level (e.g., a high level), for example, an alternating current (AC) signal. An interval where the test signal ARj a is in the active level may be defined as a test interval TST.

A circuit for providing the test signal ARja may be separately implemented in a display device DD (refer to FIG. 1). For example, the circuit for providing the test signal ARja may be implemented together with a scan driving circuit SD (refer to FIG. 1) or a light emitting driving circuit EDC (refer to FIG. 1), but the invention is not particularly limited thereto.

The test TFT T10 may be kept turned on in the test interval TST. After the test interval TST is ended, the test TFT T10 may be kept turned off.

Figure 5:
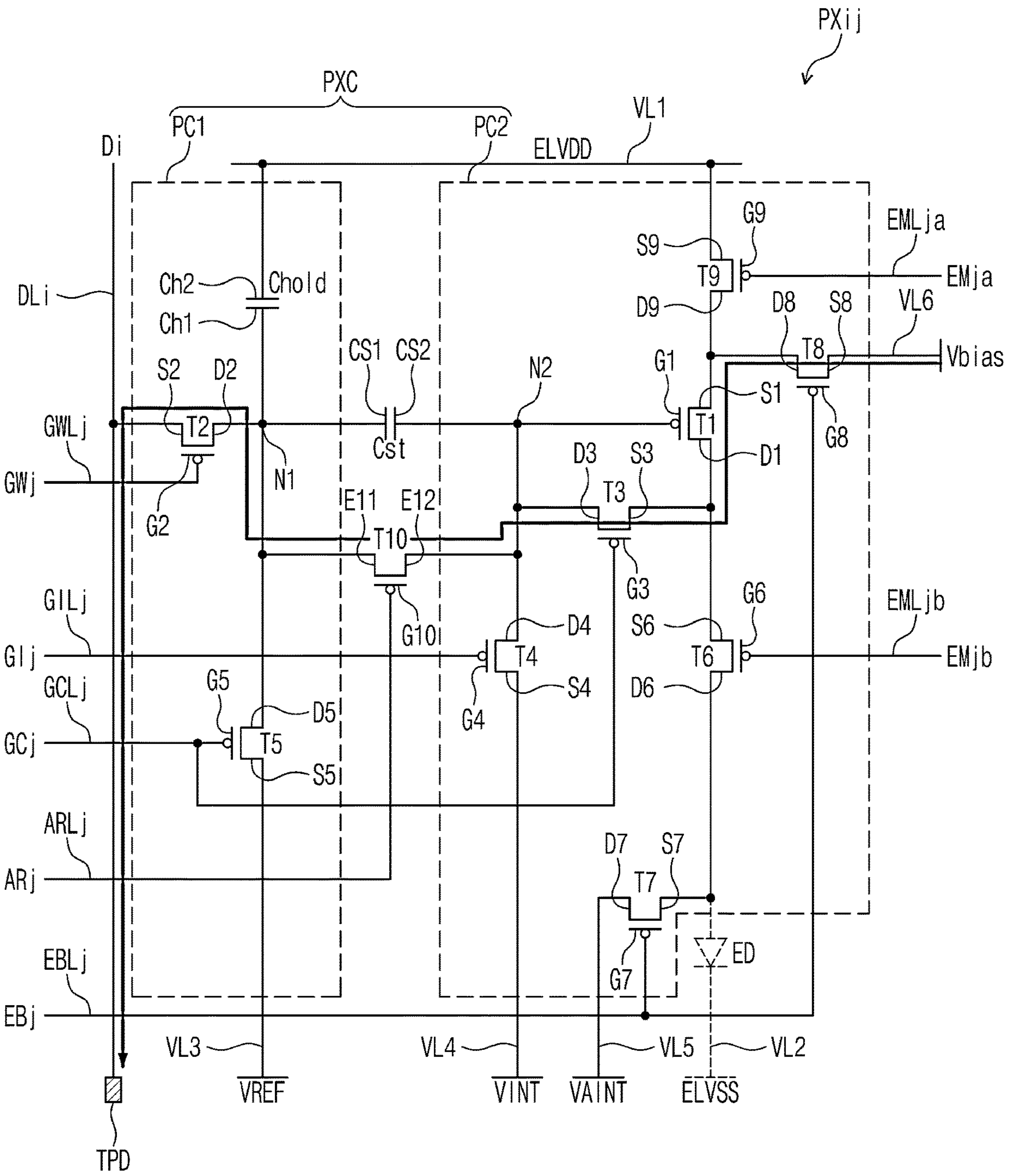
FIG. 5 is a drawing illustrating another test operation of a pixel circuit according to an embodiment of the present disclosure.
Figure 6:
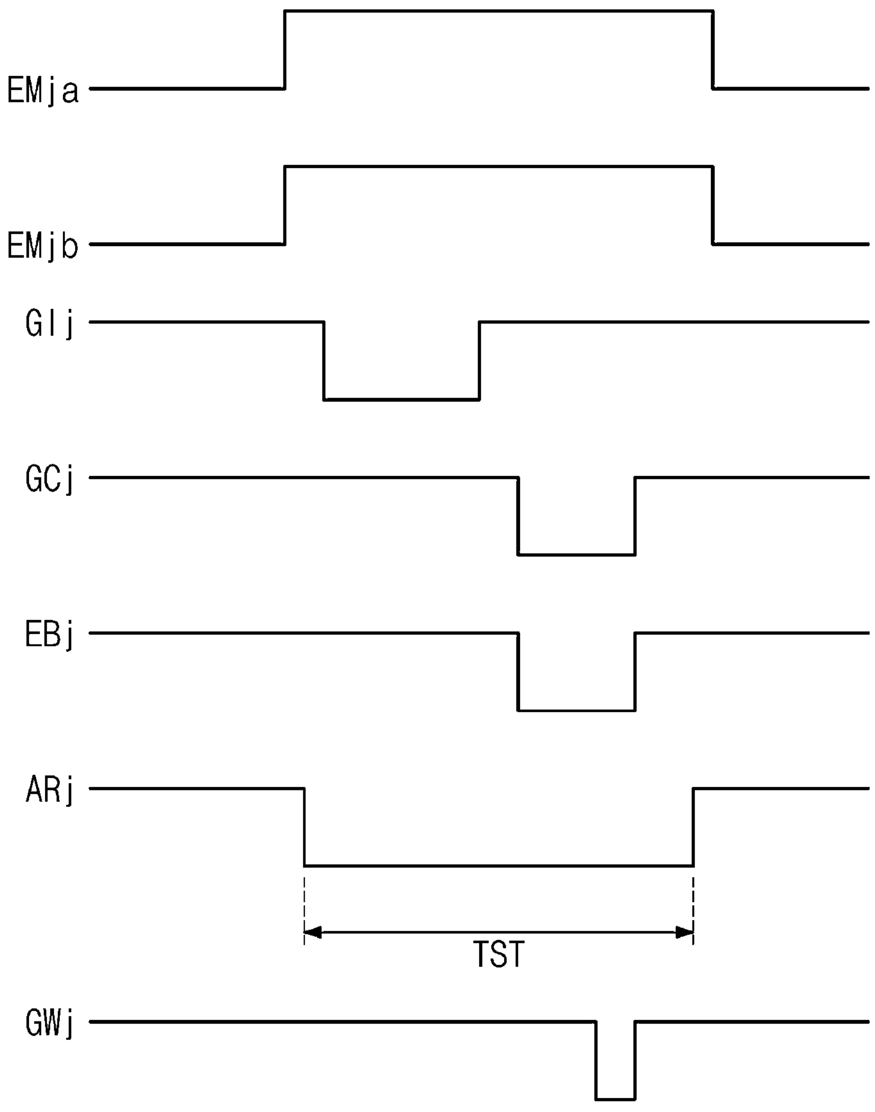
FIG. 6 is a timing diagram illustrating a test operation shown in FIG. 5.

FIG. 5 is a drawing illustrating another test operation of a pixel circuit according to an embodiment of the present disclosure. FIG. 6 is a timing diagram illustrating a test operation shown in FIG. 5.

Referring to FIGS. 5 and 6, timing of signals provided to a pixel circuit PXC may be adjusted to test whether various transistors perform a normal operation.

When light emitting control signals EMja and EMjb are in an inactive level (e.g., a high level), a scan signal GIj may be transitioned to an active level (e.g., a low level). Thereafter, the scan signal GIj may be transitioned to the inactive level, and a scan signal GCj and a scan signal EBj may be transitioned to the active level. When the scan signal GCj and the scan signal EBj is in the active level, the scan signal GWj may be transitioned to the active level.

A test voltage delivered through a first electrode S8 of an eighth transistor T8 may be measured through a test pad TPD connected with a data line DLi via the eighth transistor T8, a first transistor T1, a third transistor T3, a test TFT T10, and a second transistor T2.

Figure 7:
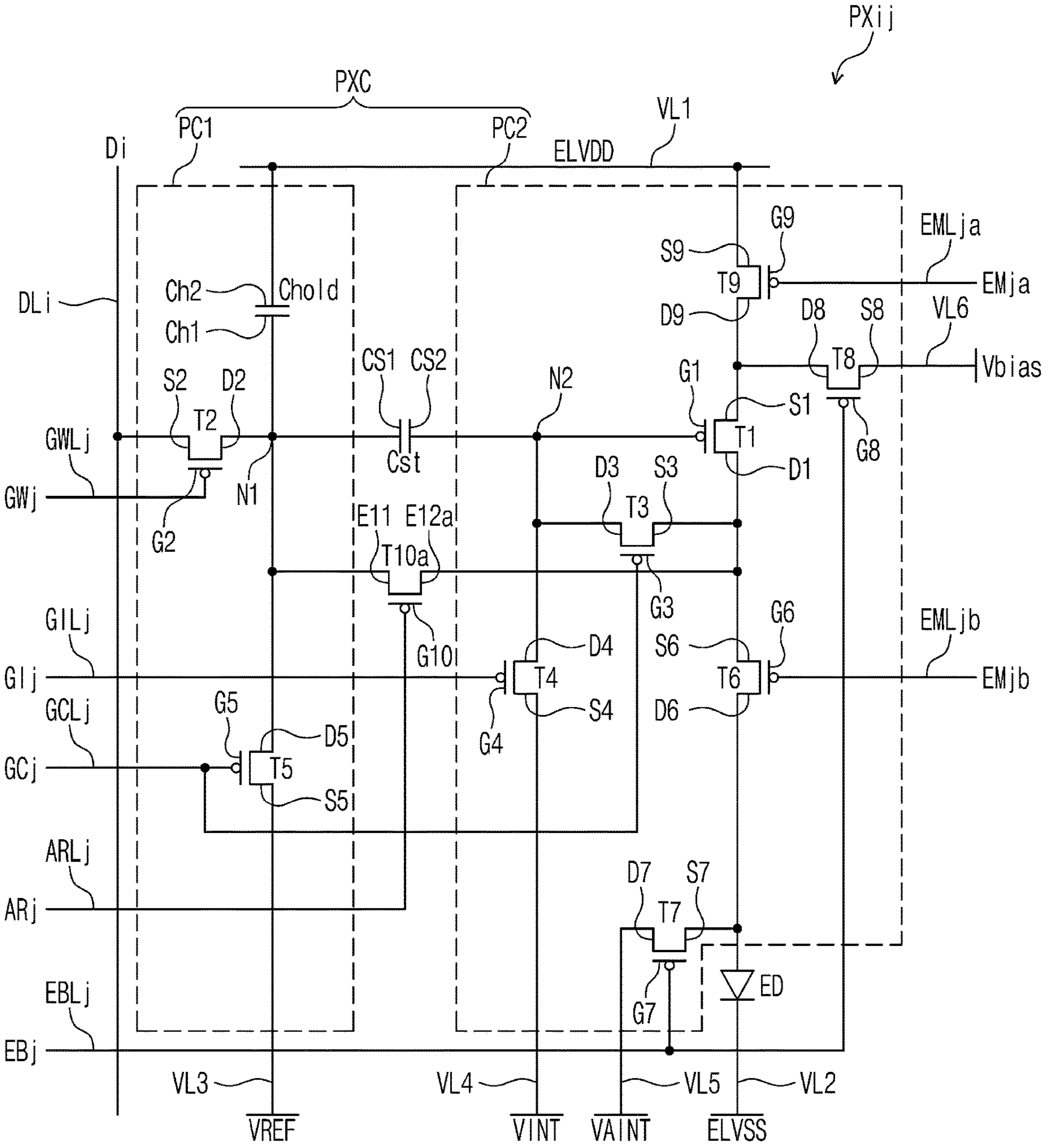
FIG. 7 is an equivalent circuit diagram of a pixel according to another embodiment of the present disclosure.

FIG. 7 is an equivalent circuit diagram of a pixel according to another embodiment of the present disclosure.

Referring to FIG. 7, a test unit may be connected to a first circuit part PC1 and a second circuit part PC2. For example, the test unit may include a test TFT T10*a*. The test TFT T10*a* may be connected to the first circuit part PC1 and the second circuit part PC2. A data line DLi connected to a test pad TPD (refer to FIG. 3) and a circuit operation region including a first transistor T1 (or the driving TFT) may be connected with each other by the test TFT T10*a*. Thus, an array test of a pixel circuit PXC is possible using the test TFT T10*a*.

The test TFT T10*a* may include a first electrode E11 connected to a first node N1, a second electrode E12*a* connected to a second electrode D1 of the first transistor T1, and a gate electrode G10 connected to a test line ARLj. The test TFT T10*a* may be turned on by the test signal ARj received through the test line ARLj to electrically connect the first node N1 and the second electrode D1 of the first transistor T1.

Figure 8:
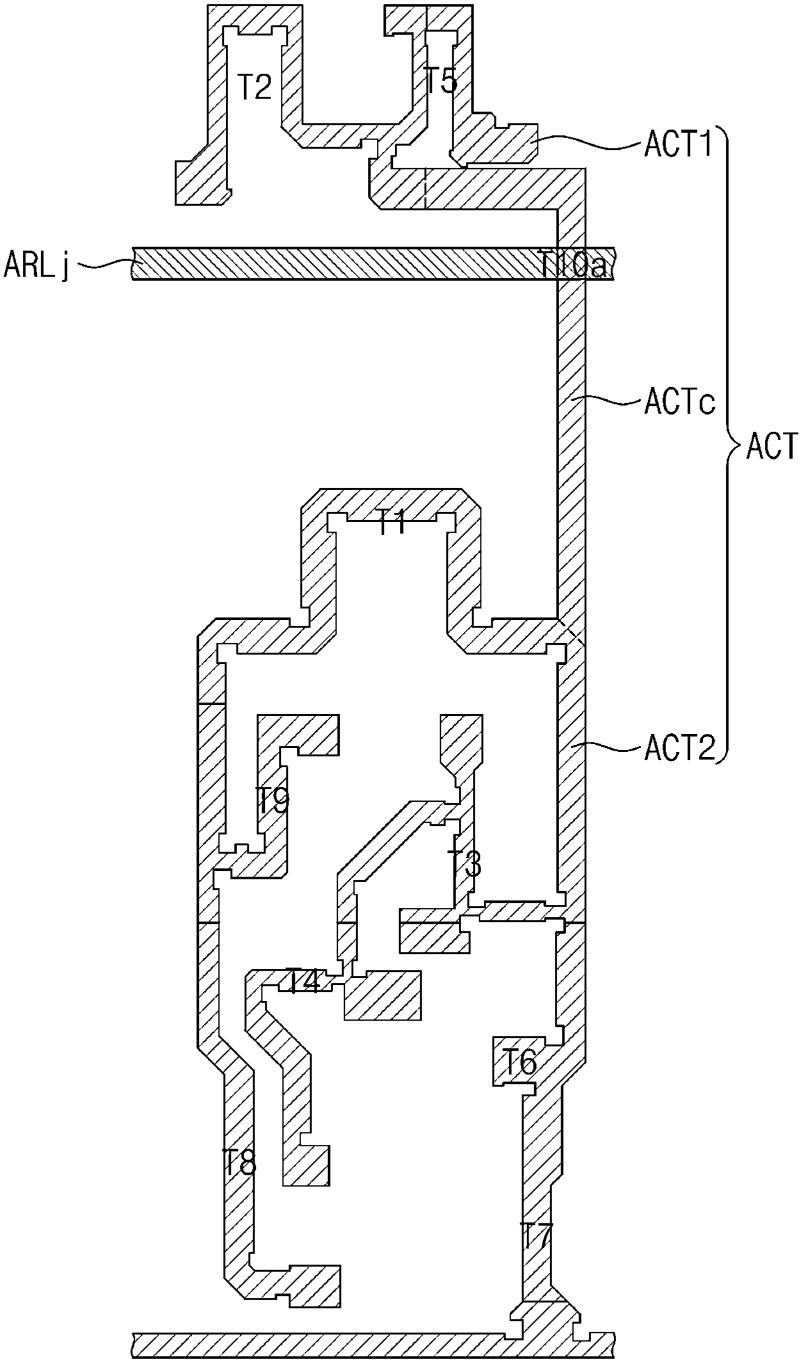
FIG. 8 is a drawing illustrating some components making up a pixel shown in FIG. 7.

FIG. 8 is a drawing illustrating some components making up a pixel shown in FIG. 7.

Referring to FIGS. 7 and 8, a semiconductor pattern ACT and a test line ARLj included in first to ninth transistors T1-T9 and a test TFT T10*a* are illustrated.

The semiconductor pattern ACT may include a first semiconductor pattern ACT1 included in a first circuit part PC1, a second semiconductor pattern ACT2 included in a second circuit part PC2, and an additional semiconductor pattern ACTc which connects the first semiconductor pattern ACT1 and the second semiconductor pattern ACT2. The test TFT T10*a* may be implemented by the additional semiconductor pattern ACTc and the test line ARLj overlapped with the additional semiconductor pattern ACTc.

Figure 9:
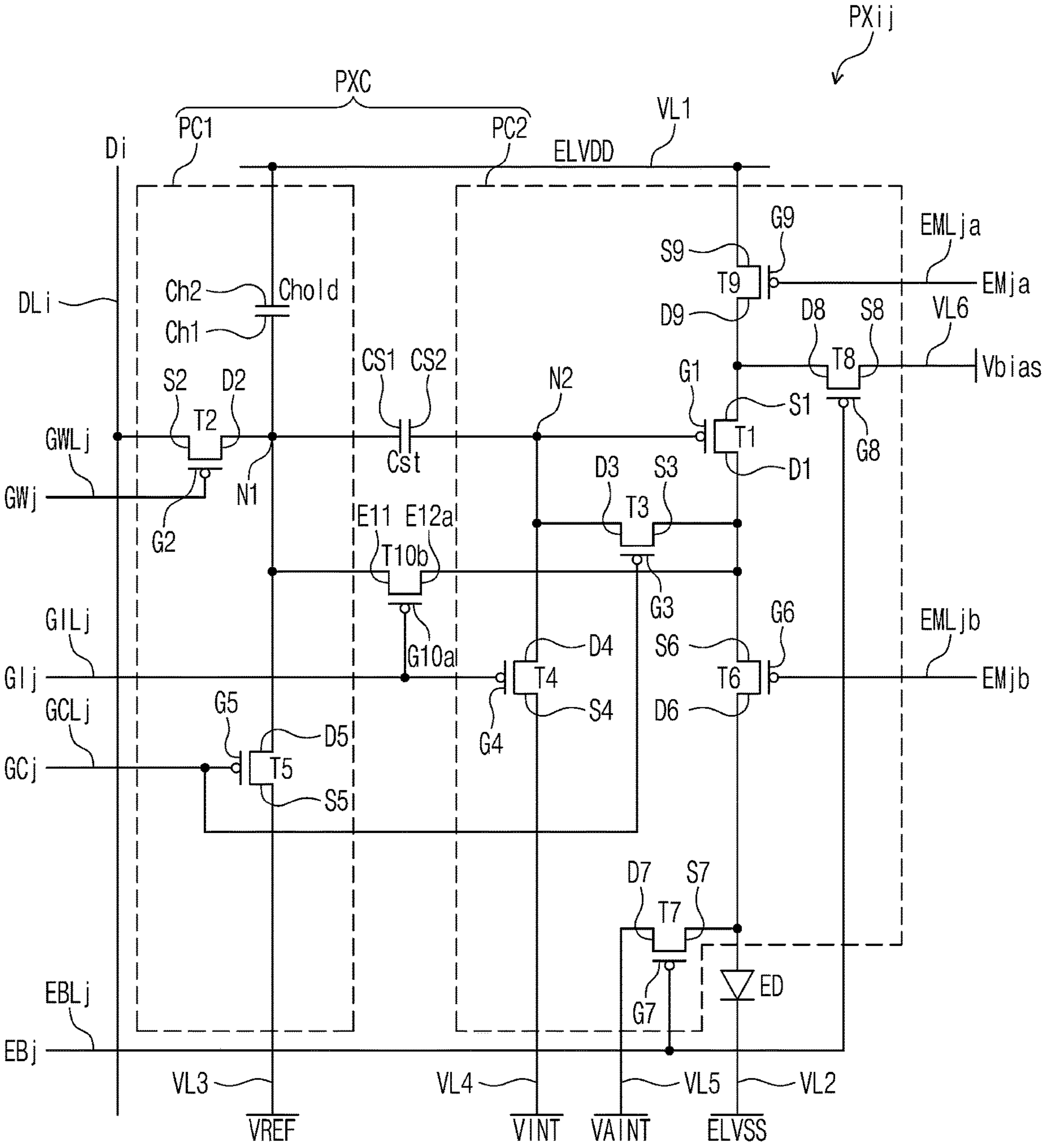
FIG. 9 is an equivalent circuit diagram of a pixel according to still another embodiment of the present disclosure.

FIG. 9 is an equivalent circuit diagram of a pixel according to still another embodiment of the present disclosure.

Referring to FIG. 9, a test unit may be connected to a first circuit part PC1 and a second circuit part PC2. For example, the test unit may include a test TFT T10*b*. The test TFT T10*b* may be connected to the first circuit part PC1 and the second circuit part PC2. According to an embodiment of the present disclosure, a data line DLi connected to a test pad TPD (refer to FIG. 3) and a circuit operation region including a first transistor T1 (or the driving TFT) may be connected with each other by the test TFT T10*b*. Thus, an array test of a pixel circuit PXC is possible using the test TFT T10*b*.

The test TFT T10*b* may include a first electrode E11 connected to a first node N1, a second electrode E12*a* connected to a second electrode D1 of the first transistor T1, and a gate electrode G10*a* connected to a scan line GILj. The test TFT T10*b* may be turned on by a scan signal GIj received through the scan line GILj to electrically connect the first node N1 and the second electrode D1 of the first transistor T1.

Figure 10:
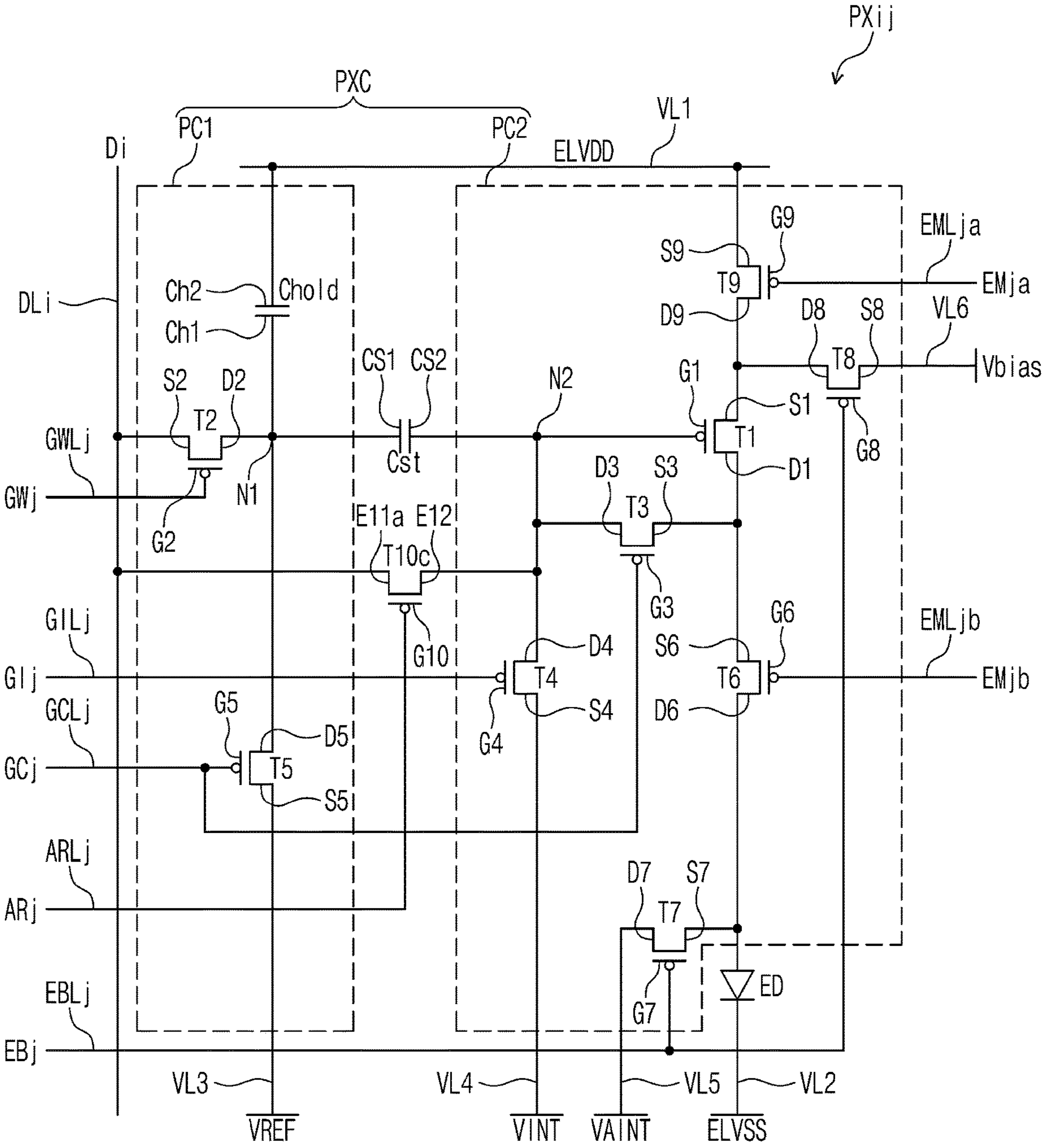
FIG. 10 is an equivalent circuit diagram of a pixel according to yet another embodiment of the present disclosure.

FIG. 10 is an equivalent circuit diagram of a pixel according to yet another embodiment of the present disclosure.

Referring to FIG. 10, a test unit may be connected to a first circuit part PC1 and a second circuit part PC2. For example, the test unit may include a test TFT T10*c*. The test TFT T10*c* may be connected to the first circuit part PC1 and the second circuit part PC2. According to an embodiment of the present disclosure, a data line DLi connected to a test pad TPD (refer to FIG. 3) and a circuit operation region including a first transistor T1 (or the driving TFT) may be connected with each other by the test TFT T10*c*. Thus, an array test of a pixel circuit PXC is possible using the test TFT T10*c*.

The test TFT T10*c* may include a first electrode E11*a* connected to the data line DLi, a second electrode E12 connected with a second node N2, and a gate electrode G10 connected to a test line ARLj. The test TFT T10*c* may be turned on by a test signal ARj received through the test line ARLj to electrically connect the data line DLi and the second node N2.

Figure 11:
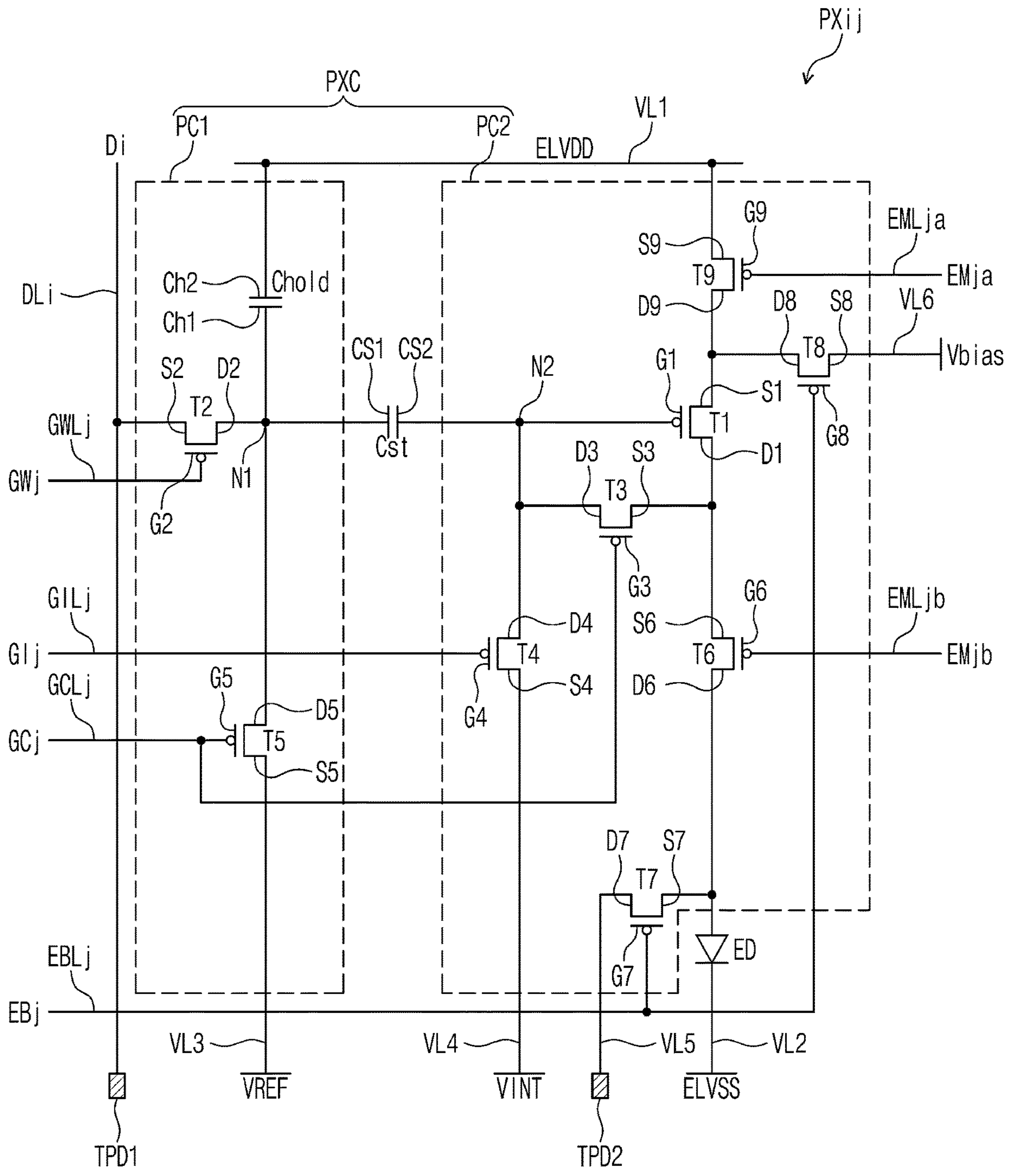
FIG. 11 is a drawing illustrating a test operation of a pixel circuit according to another embodiment of the present disclosure.
Figure 12:
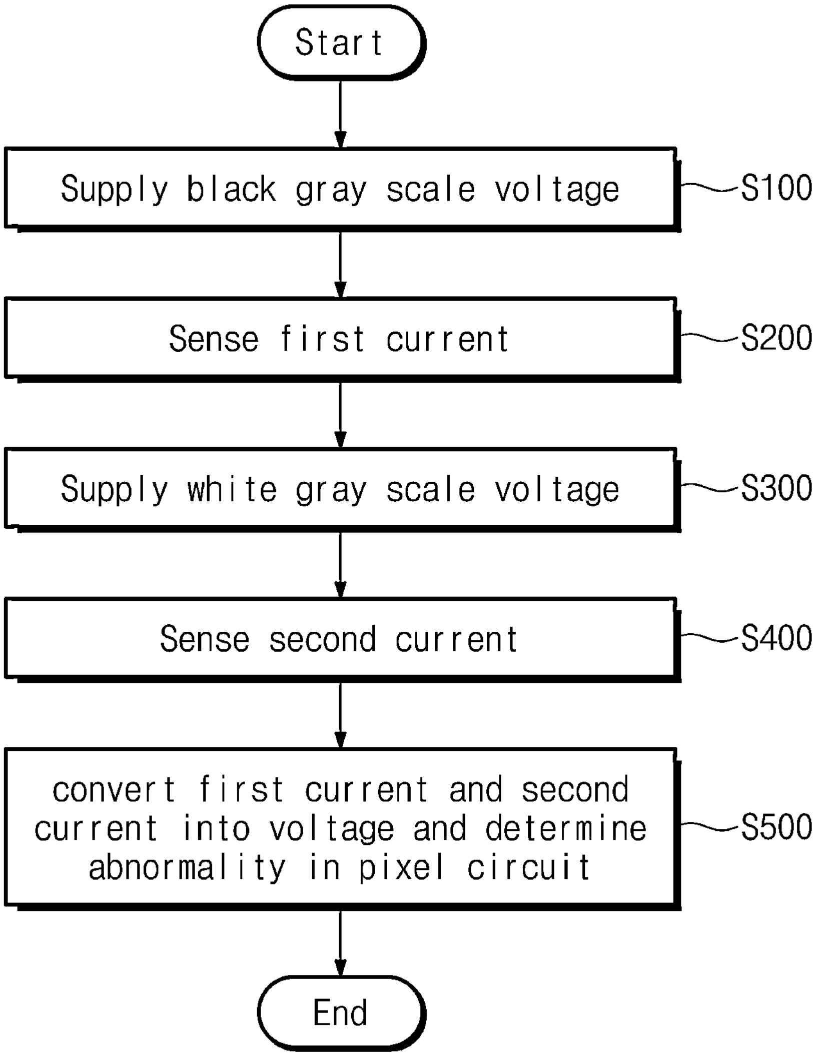
FIG. 12 is a flowchart illustrating a test operation of a pixel circuit shown in FIG. 11.

FIG. 11 is a drawing illustrating a test operation of a pixel circuit according to another embodiment of the present disclosure. FIG. 12 is a flowchart illustrating a test operation of a pixel circuit shown in FIG. 11.

Referring to FIGS. 11 and 12, a pixel circuit PXC may be connected with a first test pad TPD1 and a second test pad TPD2. The first test pad TPD1 may be connected to a first circuit part PC1, and the second test pad TPD2 may be connected to a second circuit part PC2. For example, the first test pad TPD1 may be connected to a data line DLi, and the second test pad TPD2 may be connected to a fifth driving voltage line VL5.

When a test interval is started, a scan signal GIj and a scan signal GCj may be sequentially transitioned to an active level. Thereafter, when a scan signal GWj is transitioned to the active level, in S100, a black gray scale voltage may be supplied through the data line DLi. When the black gray scale voltage is supplied, in S200, a first current flowing through a second test pad TPD2 may be sensed. When the first current is sensed, the scan signal GIj and the scan signal GCj may be sequentially transitioned to the active level. Thereafter, when the scan signal GWj is transitioned to the active level, in S300, a white gray scale voltage may be supplied through the data line DLi. When the white gray scale voltage is supplied, in S400, a second current flowing through the second test pad TPD2 may be sensed.

In S500, array test equipment may convert the first current and the second current sensed through the second test pad TPD2 into a converted voltage using resistance and may determine abnormality in the pixel circuit PXC based on the voltage.

Figure 13:
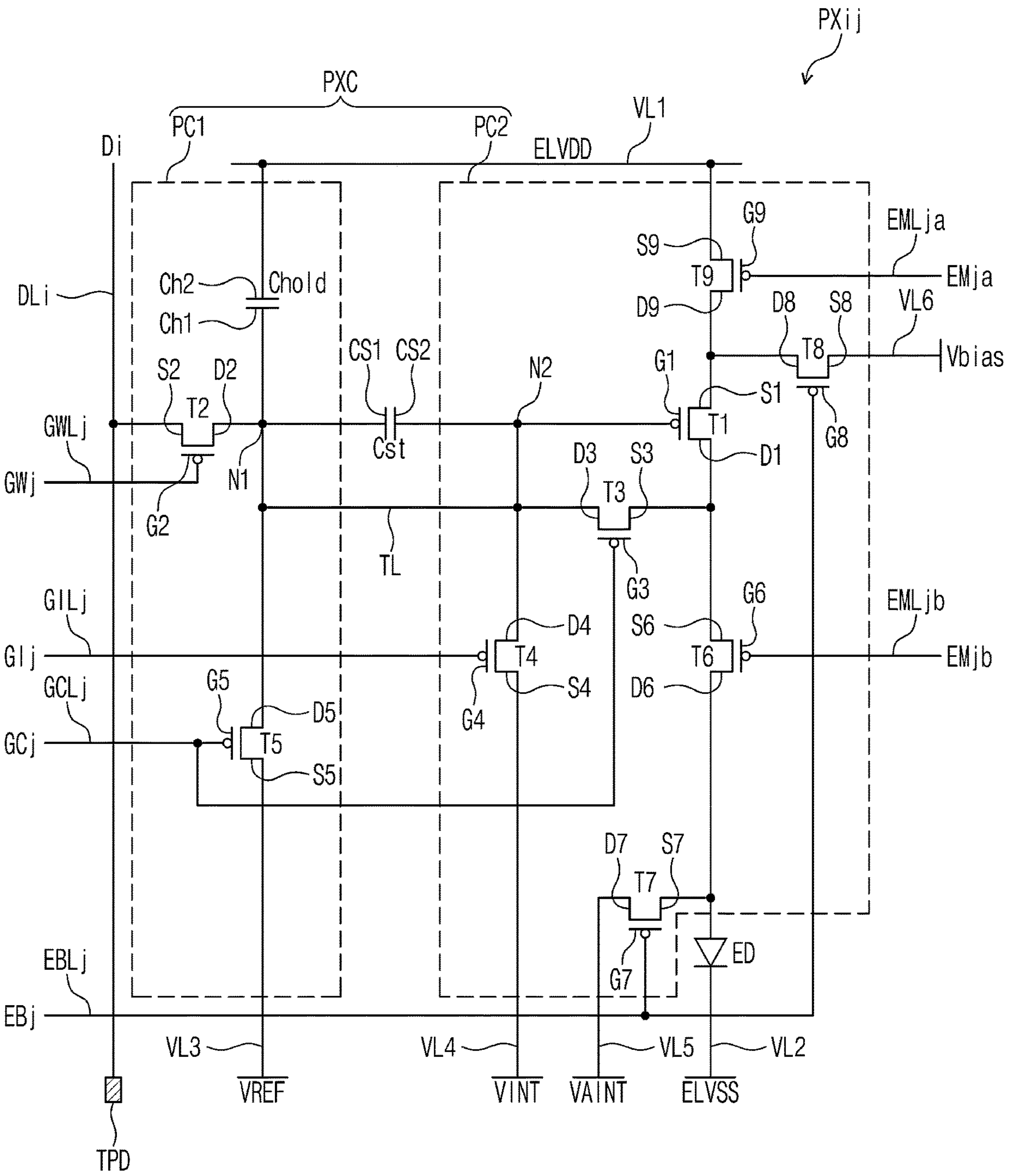
FIG. 13 is an equivalent circuit diagram of a pixel for test according to still another embodiment of the present disclosure.
Figure 14A:
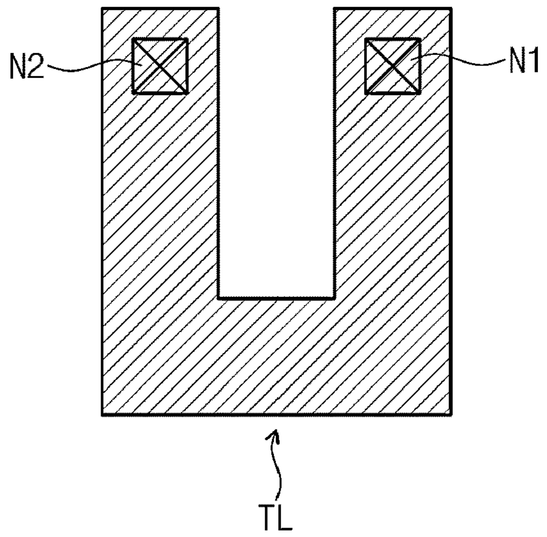
FIG. 14A is a drawing illustrating a test unit shown in FIG. 13.
Figure 14B:
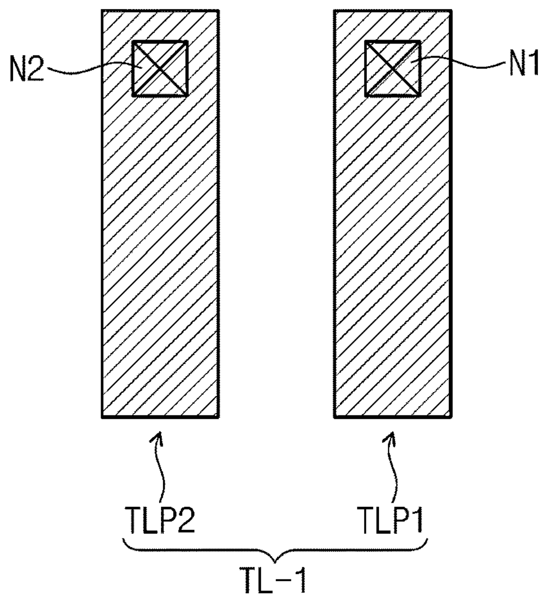
FIG. 14B is a drawing illustrating a test unit shown in FIG. 13.

FIG. 13 is an equivalent circuit diagram of a pixel for test according to still another embodiment of the present disclosure. FIG. 14A is a drawing illustrating a test unit shown in FIG. 13. FIG. 14B is a drawing illustrating a test unit shown in FIG. 13.

Referring to FIG. 13, a test unit TL may be connected to a first circuit part PC1 and a second circuit part PC2. For example, the test unit TL may include a conductive line TL. The conductive line TL may be connected to the first circuit part PC1 and the second circuit part PC2.

It is illustratively shown that the conductive line TL is connected to a first node N1 and a second node N2 in FIG. 13, but the invention is not particularly limited thereto. For example, the conductive line TL may be connected to a data line DLi and a second electrode CS2 of a transfer capacitor Cst or may be connected to a first electrode CS1 of the transfer capacitor Cst and a second electrode D1 of a first transistor T1 in other embodiments.

According to an embodiment of the present disclosure, the data line DLi connected to a test pad TPD and a circuit operation region including the first transistor T1 (or the driving TFT) may be connected with each other by the conductive line TL. Thus, an array test of a pixel circuit PXC is possible using the conductive line TL.

FIG. 14A is a drawing illustrating a test unit shown in FIG. 13. FIG. 14B is a drawing illustrating a test unit shown in FIG. 13. FIG. 14A illustrates the conductive line TL before the array test is ended. FIG. 14B illustrates a cut conductive line TL-1 after the array test is ended. A first line portion TLP1 connected to the first node N1 and a second line portion TLP2 connected to the second node N2 may remain in the finished product, and the first line portion TLP1 and the second line portion TLP2 may be electrically insulated from each other.

As describe above, the first circuit part and the second circuit part of the pixel circuit may be connected with each other by the test unit. The test unit may include a test TFT or a conductive line. In other words, the first circuit part connected with the data line and the second circuit part including the driving TFT may be connected with each other by the test unit. Thus, the array test of the pixel circuit is possible by means of the test unit. When it is determined that it is bad (i.e., malfunction) through the array test, the pixel circuit may pass through a repair process. When it is impossible to repair the pixel circuit, the process may not proceed to a next process and be ended. When it is determined that the pixel circuit is normal through the array test, the light emitting element may be formed through a subsequent process.

While the present disclosure has been described with reference to an embodiment thereof, it will be apparent to those of ordinary skill in the art that various changes and modifications may be made thereto without departing from the spirit and scope of the present disclosure as set forth in the following claims. Accordingly, the technical scope of the present disclosure should not be limited to the contents described in the detailed description of the specification, but should be defined by the claims.

What is claimed is:

1. An electronic device comprising a display panel, comprising:
- a plurality of pixels, each of which includes a light emitting element and a pixel circuit for driving the light emitting element;
- a plurality of scan lines connected to the pixel circuit; and
- a data line connected to the pixel circuit,
- wherein the pixel circuit includes:
- a transfer capacitor connected to a first node and a second node;
- a first circuit part including the first node;
- a second circuit part including the second node and connected with the light emitting element; and
- a test unit connected to the first circuit part and the second circuit part,
- wherein the test unit includes a test thin-film transistor (TFT) that includes a first electrode connected to the first node, a second electrode connected to the second node, and a gate electrode.

2. The electronic device of claim 1, further comprising:
- a test line connected to the gate electrode of the test TFT,
- wherein a test signal for controlling an operation of the test TFT is provided to the test line.

3. The electronic device of claim 1, wherein the test unit includes a first line portion connected to the first node and a second line portion connected to the second node, and
- wherein the first line portion and the second line portion are electrically insulated from each other.

4. A display panel, comprising:
- a plurality of pixels, each of which includes a light emitting element and a pixel circuit for driving the light emitting element;
- a plurality of scan lines connected to the pixel circuit; and
- a data line connected to the pixel circuit,
- wherein the pixel circuit includes:
- a transfer capacitor connected to a first node and a second node;
- a first circuit part including the first node;
- a second circuit part including the second node and connected with the light emitting element;
- a test unit connected to the first circuit part and the second circuit part; and
- first to sixth driving voltage lines connected to the pixel circuit and the light emitting element,
- wherein the first circuit part includes:
- a switching TFT connected between the first node and the data line;
- a hold capacitor connected between the first node and the first driving voltage line; and
- a transfer TFT connected between the first node and the third driving voltage line, and
- wherein a first power voltage is supplied to the first driving voltage line and a reference voltage is supplied to the third driving voltage line.

5. The display panel of claim 4, wherein the test unit includes a test TFT, and
- wherein the test TFT includes a first electrode connected to the data line, a second electrode connected to the second node, and a gate electrode.

6. The display panel of claim 4, wherein the second circuit part includes:
- a driving TFT including a gate electrode connected to the second node, a first electrode, and a second electrode;
- a compensation TFT connected to the second node and the second electrode of the driving TFT;
- a first initialization TFT connected to the second node and the fourth driving voltage line;
- a light emitting control TFT connected between the second electrode of the driving TFT and the light emitting element;
- an operation control TFT connected between the first electrode of the driving TFT and the first driving voltage line;
- a second initialization TFT connected to the light emitting control TFT and the fifth driving voltage line; and
- a bias TFT connected to the first electrode of the driving TFT and the sixth driving voltage line.

7. The display panel of claim 6, wherein the test unit includes a test TFT, and
- wherein the test TFT includes a first electrode connected to the first node, a second electrode connected to the second electrode of the driving TFT, and a gate electrode.

8. The display panel of claim 7, wherein the gate electrode of the test TFT is connected to one of the plurality of scan lines.

9. The display panel of claim 7, further comprising:
- a test line connected to the gate electrode of the test TFT,
- wherein a test signal for controlling an operation of the test TFT is provided to the test line.

10. A method for testing a display panel, the method comprising:
- supplying a test voltage to a pixel circuit, wherein the pixel circuit includes a transfer capacitor, a first circuit part electrically connected to a first electrode of the transfer capacitor, a second circuit part electrically connected to a second electrode of the transfer capacitor, and a test unit connected to the first circuit part and the second circuit part, wherein the test unit includes a test thin-film transistor (TFT) that includes a first electrode connected to the first circuit part, a second electrode connected to the second circuit part, and a gate electrode; and measuring a signal delivered to at least one line connected to the pixel circuit.

11. The method of claim 10, wherein the test voltage is supplied to the second circuit part, wherein the at least one line is connected to the first circuit part, and wherein the signal is a signal delivered to the first circuit part through the second circuit part and the test unit.

12. The method of claim 10, wherein the test voltage is supplied through a data line connected to the first circuit part, wherein the test voltage includes a black gray scale voltage and a white gray scale voltage, and wherein the measuring of the signal includes:

sensing a first current of the signal through the at least one line connected to the second circuit part, when the black gray scale voltage is supplied;

sensing a second current of the signal through the at least one line connected to the second circuit part, when the white gray scale voltage is supplied; and converting the first current and the second current into a converted voltage and determining abnormality in the pixel circuit based on the converted voltage.

13. The method of claim 10, wherein a direct current (DC) signal for test is provided to the gate electrode.

14. The method of claim 10, wherein an alternating current (AC) signal for test is provided to the gate electrode.

15. The method of claim 10, wherein one of a plurality of scan signals provided to the pixel circuit is provided to the gate electrode.

16. The method of claim 10, wherein the pixel circuit further includes a test unit connected to the first circuit part and the second circuit part, and the method further comprising:

removing a portion of the test unit, after measuring the signal.

17. The method of claim 10, wherein the pixel circuit and a light emitting element, the operation of which is controlled by the pixel circuit, are connected with first to sixth driving voltage lines, wherein the first circuit part includes:

a switching TFT connected between a first node and a data line;

a hold capacitor connected between the first node and the first driving voltage line; and a transfer TFT connected between the first node and the third driving voltage line, wherein the second circuit part includes:

a driving TFT including a gate electrode connected to a second node, a first electrode, and a second electrode;

a compensation TFT connected to the second node and the second electrode of the driving TFT;

a first initialization TFT connected to the second node and the fourth driving voltage line;

a light emitting control TFT connected between the second electrode of the driving TFT and the light emitting element;

an operation control TFT connected between the first electrode of the driving TFT and the first driving voltage line;

a second initialization TFT connected to the light emitting control TFT and the fifth driving voltage line; and a bias TFT connected to the first electrode of the driving TFT and the sixth driving voltage line, the method further comprising:

determining whether an operation of at least one of the switching TFT, the transfer TFT, the driving TFT, the compensation TFT, the first initialization TFT, the light emitting control TFT, the operation control TFT, the second initialization TFT, and the bias TFT malfunctions based on the signal.

18. The method of claim 17, wherein the pixel circuit further includes a test unit connected to the first circuit part and the second circuit part, wherein the test unit is connected to the first electrode of the transfer capacitor and the second electrode of the transfer capacitor, is connected to the data line and the second electrode of the transfer capacitor, or is connected to the first electrode of the transfer capacitor and the second electrode of the driving TFT, to deliver the signal based on the test voltage from the first circuit part to the second circuit part or from the second circuit part to the first circuit part.

* * * * *